Aug. 13, 1935.　　　　I. W. WEPPLO　　　　2,010,973
GASOLINE VAPORIZER
Filed March 6, 1933
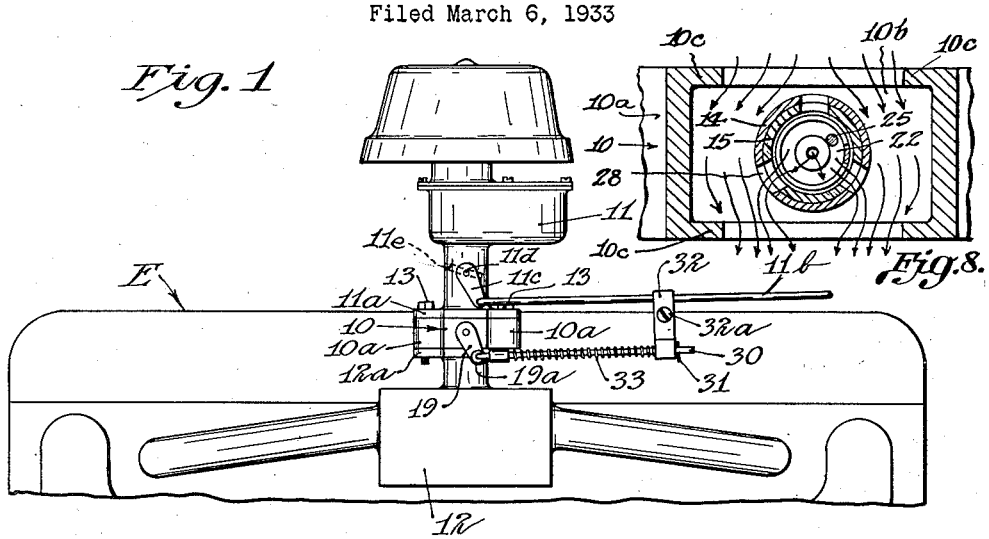
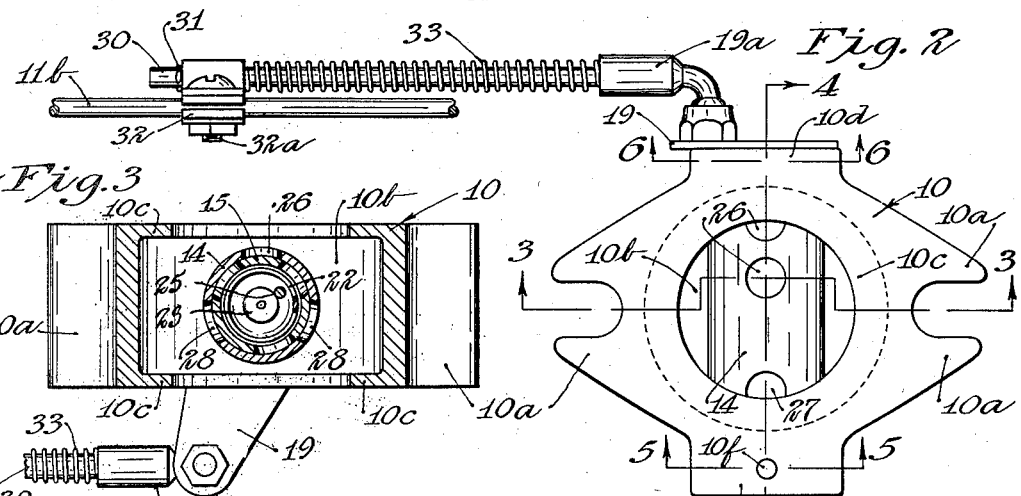
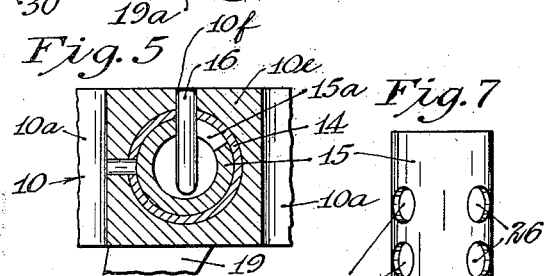
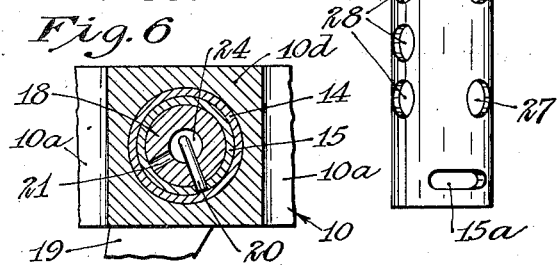
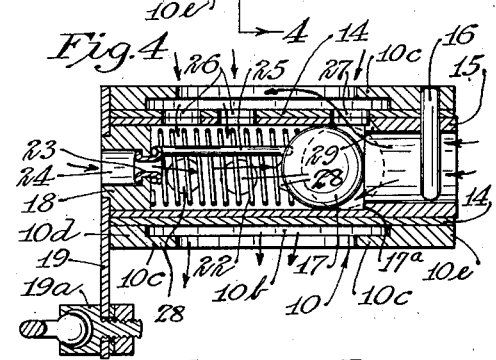
Inventor
Isaac W. Wepplo
By his Attorneys
Williamson & Williamson Patented Aug. 13, 1935

2,010,973

UNITED STATES PATENT OFFICE 2,010,973

GASOLINE VAPORIZER

Isaac W. Wepplo, Minneapolis, Minn.

Application March 6, 1933, Serial No. 659,639

7 Claims. (Cl. 48—180)

My invention relates to liquid fuel vaporizers for induction systems of internal combustion engines.

In the carburetion and induction systems now in use in connection with automobile engines and other internal combustion engines, the heavy ends of the fuel are not vaporized but instead pass into the combustion chambers in the form of small drops which are not burned and which are hence wasted. If the drops of the heavy ends of the fuel could be broken up and vaporized, additional air could be admitted to support combustion of the vaporized heavy ends and the efficiency or horsepower hours per pound of fuel attainable by the engine would be quite appreciably increased.

It is an object of my invention to provide a device capable of breaking up and vaporizing previously unvaporized drops of liquid fuel in the induction systems of internal combustion engines.

Another object is to provide such a vaporizer whereby additional air is admitted to the induction system to support combustion of the fuel vaporized thereby.

Yet another object is to provide such a vaporizer wherein the additional air admitted thereby is suitably directed to efficiently break up and vaporize the previously unvaporized portions of fuel passing through the vaporizer and is thoroughly mixed with the fuel and air mixture passing through the vaporizer.

Still another object is to provide such a vaporizer which can be conveniently and easily installed between the throttle valve and the intake manifold of an induction system to act upon the mixture passing from the carburetor to the intake manifold.

Still another object is to provide such a vaporizer which may be so controlled by the throttle operating mechanism that it is prevented from operating when the throttle is in closed or idling position and is positioned for operation when the throttle is opened, the degree to which the vaporizer is permitted to come into action depending on the degree of opening of the throttle.

Still another object is to provide such a vaporizer wherein the action thereof is automatically held at a minimum when low vacuum conditions exist in the intake manifold and is automatically increased to maximum when the degree of vacuum in the intake manifold passes or exceeds a predetermined degree.

These and other objects and advantages of the invention will be more fully set forth in the following description made in connection with the accompanying drawing, in which like reference characters refer to similar parts throughout the several views, and in which:—

Fig. 1 is a side view of the upper portion of an automobile engine showing my fuel vaporizer associated with the induction system thereof;

Fig. 2 is a top view of my fuel vaporizer;

Fig. 3 is a vertical sectional view taken along the line 3—3 of Fig. 2 as indicated by the arrows;

Fig. 4 is a vertical sectional view taken along the line 4—4 of Fig. 2 as indicated by the arrows;

Fig. 5 is a vertical sectional view taken along the line 5—5 of Fig. 2 as indicated by the arrows;

Fig. 6 is a vertical sectional view taken along the line 6—6 of Fig. 2 as indicated by the arrows;

Fig. 7 is a side view of one of the internal parts of the fuel vaporizer, and

Fig. 8 is a partially broken away view similar to Fig. 3 but with the sleeve valves in open position.

Referring to the drawing, my liquid fuel vaporizer is shown as applied to the fuel induction system of an automobile engine E. This induction system includes a carburetor 11 and an intake manifold 12. The carburetor 11 is of the downdraft type having a throttle valve 11e of the disk or butterfly type mounted on a throttle shaft 11d. An arm 11c, mounted on the throttle shaft 11d, is connected by means of a throttle control rod 11b to foot and hand operated throttle actuating members (not shown). All of the above described structure is of well known conventional form.

The main body of my device consists of a block of metal 10 adapted to be interposed between the normally connected flanges 11a and 12a of the carburetor 11 and the intake manifold 12 of the induction system of an internal combustion engine E. At diametrically opposite sides of the block 10 are integrally formed vertically grooved ears or lugs 10a adapted to engage bolts 13 which extend through mounting holes in the flange 11a, through the grooves in the lugs 10a, and through mounting holes in the flange 12a to draw the block 10 and the flanges 11a and 12a tightly together. Disposed at right angles to the pair of lugs 10a is a diametrically disposed pair of integral projections 10d and 10e terminating in parallel flat surfaces.

The central portion of the block 10 is hollowed out to form a chamber or passageway 10b axially aligned with the outlet passage of the carburetor 11 and the inlet passage of the manifold 12. The chamber 10b is somewhat larger in diameter than the outlet passage of the carburetor and the inlet passage of the manifold. A pair of integral annular flanges 10c extend inwardly at each end of the chamber 10b in a plane transverse thereto to reduce the inlet and outlet of the chamber to a diameter substantially the same as the diameters of the outlet passage of the carburetor and the inlet passage of the manifold.

Extending horizontally across said chamber is a sleeve 14, the respective ends of which are substantially flush with the flat surfaces of the projections 10d and 10e. A second sleeve 15 is disposed within the first sleeve 14 in relatively snug but revoluble relation thereto. The second sleeve 15 is of substantially the same length as the first sleeve 14. The projection 10e is provided with an aperture 10f and the outer sleeve 14 is provided with an aperture registering therewith. The inner sleeve 15 is provided with a slot 15a aligned with the apertures. A pin 16 extends through the apertures in the projection 10e and the sleeve 14, and through the slot 15a in the inner sleeve 15 to restrain the outer sleeve 14 against all movement, to prevent longitudinal movement of the inner sleeve 15, and to limit the angle through which the inner sleeve 15 may be rotated.

The end portion of the revoluble sleeve 15 at which the pin 16 is located is open to the surrounding atmosphere and has a slightly smaller internal diameter than the opposite end and middle portions thereof, so as to form a shoulder facing toward the middle portion. This shoulder is slightly beveled to form a valve seat 17a.

A ball 17, having a diameter slightly less than that of the interior of the medial portion of the revoluble sleeve 15 is located within the medial portion of the revoluble sleeve 15 to cooperate with the seat 17a previously described.

A cylindrical closure member 18 carrying a crank arm 19 is snugly fitted into the end of the revoluble sleeve 15 opposite the pin 16. A pin 20 extends through aligned apertures in the revoluble sleeve 15 and the closure member 18 to retain the closure member in fixed relation to the revoluble sleeve 15. The closure member 18 is provided with a second aperture 21 so that the crank arm 19 may be secured to the revoluble sleeve 15 in a second angular position relative thereto. A helical compression spring 22 is disposed under compression between the inner end of the closure member 18 and the ball 17 to urge the ball toward its seat 17a. An eyelet 23, disposed in the reduced inner end portion of an axial aperture 24 in the closure member 18 secures the outer end of an inwardly extending stop pin 25 to the inner side of the closure member and forms an air inlet port of restricted capacity communicating with the surrounding atmosphere. The stop pin 25 is arranged to limit inward movement of the ball 17.

The upper side of the stationary sleeve 14 is provided with an aligned row of three circular apertures 26 and 27 arranged as shown in Figs. 2, 4 and 7. The stationary sleeve 14 is also provided with two rows of aligned, evenly spaced, circular apertures 28 arranged as shown in Figs. 3 and 7 and each located somewhat less than 120 angular degrees from the upper row of apertures 26 and 27. The revoluble sleeve 15 is provided with apertures which register with the apertures in the stationary sleeve 14 when the revoluble sleeve 15 is at one of its limits of movement and which are covered by unapertured portions of the stationary sleeve 14 when the revoluble sleeve 15 is at the other limit of its movement. The slot 15a in the revoluble sleeve 15 is so proportioned that the apertures 28 in the revoluble sleeve 15 are totally covered only when the revoluble sleeve 15 is at the last mentioned limit of its movement. The apertures 26, 27 and 28 in the sleeves 14 and 15 cooperate to form valves operable by movement of the crank arm 19.

At points aligned respectively with the three rows of apertures the valve seat 17a in the interior of the revoluble sleeve 15 is notched as at 29 to provide for passage of a slight quantity of air through the notches 29 when the ball 17 is engaged with its seat.

It is obvious that the interior of the stationary sleeve 14 and apertured portions of the same sleeve together form a passageway for passage therethrough of air into the chamber 10b and that the apertured revoluble sleeve 15 and the ball 17 constitute valve members cooperating respectively with the stationary sleeve 14 and the seat 17a of the revoluble sleeve 15 to close said passageway.

The crank arm 19 is provided adjacent its outer end with a ball and socket connection 19a of conventional form. A rod 30 is secured at one end to the shank portion of the ball and socket connection 19a and has at its other end a cotter key 31 disposed in a suitable aperture. Inwardly of the cotter key 31, a clamping member 32 is slidably mounted on the rod 30 and a helical compression spring 33 is concentrically and coaxially disposed about the rod 30 with its respective ends bearing against the clamping member 32 and the shank portion of the ball and socket connection 19a. The clamping member 32 has a portion adapted to engage or clamp the control rod 11b associated with the throttle valve 11c of the carburetor 11, this portion being brought into clamping relation by tightening a bolt 32a. The connection of the clamping member 32 to the throttle control rod 11b is made with the various parts in such corresponding positions that the valves formed by the apertured sleeves 14 and 15 will be closed when the throttle is in its position of minimum opening.

*Operation*

In normal use of my fuel vaporizer the body 10 of the same is interposed between the throttle valve of the carburetor and the intake manifold of an internal combustion engine with the apertures 26 and 27 of the stationary sleeve 14 disposed toward and facing the throttle valve and carburetor. The rod 30 of the vaporizer is of course connected to the throttle control mechanism of the internal combustion engine as previously described.

It is obvious that all of the mixture of liquid fuel and air produced in the carburetor 11 and delivered to the engine must pass through the chamber 10b of the vaporizer. When the throttle is closed or in its idling position there is, of course, a high vacuum in the intake manifold and in the chamber 10b of the vaporizer but, since the valves formed by the apertures 26, 27 and 28 in the stationary and revoluble sleeves 14 and 15 are closed, no air additional to the air already incorporated in the mixture delivered by the carburetor will be admitted.

As previously described, the revoluble sleeve 15 is moved to open the valves formed by the apertures therein and the apertures in the stationary sleeve 14, hereinafter to be referred to as sleeve valves, when the throttle is opened and the degree of opening of these sleeve valves is proportional to the degree of opening of the throttle. If the throttle is suddenly opened from its idling position to a relatively wide open position, as when rapid acceleration from an initial low speed is desired, the sleeve valves will be opened to a degree proportional to the degree of opening of the throttle. However, temporarily there will be only a very slight vacuum in the intake manifold with the result that the ball 17 will be held against its seat by the spring 22 and only a very slight amount of air will be drawn in through the eyelet 23 and the small slots 29 of the ball seat. It is apparent that up to this point the normal characteristics of the carburetor have not been appreciably affected by the fuel vaporizer and that a relatively rich mixture necessary for rapid and smooth acceleration is available during acceleration. However, as the speed of the engine increases the vacuum in the intake manifold will increase and will reach a relatively high value when the engine reaches the steady speed corresponding to the throttle opening and the load carried by the engine. When the vacuum reaches a predetermined degree at which the suction exerted thereby on the ball 17 is sufficient to overcome the pressure of the spring 22, the ball 17 will be drawn from its seat to admit air from outside the device through the open end of the revoluble sleeve 15. As the ball 17 leaves its seat the projected area thereof presented to atmospheric pressure increases from the cross sectional area of the interior of the open end of the revoluble sleeve 15 to the entire cross sectional area of the ball and hence the ball is positively forced to a position in which it engages the stop 25. As long as changes in throttle opening are such that the vacuum in the intake manifold will not be reduced below the point where the ball valve will be allowed to close the amount of air admitted to the vaporizer will be controlled by the sleeve valves which of course operate in coordination with the throttle valve. From the above it is apparent that the admission of air through the ball valve, under control of the sleeve valves will continue for all conditions where the engine is not idling and the load carried or the operating speed are not relatively suddenly increased.

If, as in the case of an automobile engine, when a steep grade is encountered, the load on the engine is increased, the vacuum in the intake manifold will be considerably decreased and the ball valve will close to cut off almost all of the air admitted to the vaporizer with the result that the carburetor will be permitted to operate with its original characteristics to deliver the relatively rich mixture required for such a condition. When the steep grade has been negotiated and the engine speed increases, the vacuum in the intake manifold will increase and the ball valve will open to restore the operating conditions which were existent before the steep grade was encountered.

From the above it is apparent that my vaporizer will permit operation of the carburetor with its natural characteristics during conditions of idling, rapid acceleration, and hill climbing and that it will operate to admit additional air under conditions of relatively steady speed and load and relatively gradual acceleration and deceleration.

So far only the operation of the air admitting valves of my vaporizer for different operating conditions has been described. However, the construction of my vaporizer is such that another function, capable of increasing the efficiency of fuel consumption, is performed as will be explained.

When the vaporizer is in full operation a portion of the mixture delivered from the carburetor will strike and be deflected by the stationary sleeve 14 as indicated by arrows in Fig. 8 so as to divide and pass therearound at both of the sides thereof. Striking the sleeve 14 will assist in breaking up and vaporizing unvaporized drops of fuel which are present in the mixture. Another and smaller portion of the mixture will enter the apertures 26 as indicated by the arrows in Fig. 8, pass through the interior of the revoluble sleeve 15 and pass out of the sleeve 15 through all of the apertures 28 except the one of each row thereof nearest the open end of the sleeve 15. Air entering through the eyelet 23 will be projected inwardly at high velocity in a direction parallel to the axis of the sleeve 15. The streams of mixture flowing through the interior of the sleeve 15 as described above will be intersected and impinged upon by the high velocity jet of air entering through the eyelet 23 as indicated by the arrows in Fig. 4 with the result that the small drops of unvaporized heavy ends of fuel which are normally present in the mixture and which will not burn in the engine are broken up and vaporized. The air admitted through the eyelet 23 exits through the apertures 28 as a part of the mixture exiting therethrough.

Air entering through the open ball valve from the atmosphere surrounding the vaporizer is deflected by the spherical surface of the ball 17 to emerge at high velocity into the chamber 10b through the aperture 27 as indicated by an arrow in Fig. 4 and the one of the apertures 28 in each row thereof closest to the open end of the sleeve 15. The air issuing from the aperture 27 has a high velocity in a direction toward the middle portion of the chamber 10b and slightly upwardly. The stream of mixture passing through the chamber 10b deflects this high velocity stream of air so that it divides and is projected toward the side walls of the chamber. In so moving this stream of air, traveling at high velocity, intersects and impinges upon the streams of mixture which pass around the stationary sleeve 14 with the result that the small drops of unvaporized heavy ends of fuel in these streams of mixture are broken up and vaporized.

The drops of unvaporized fuel do not constitute an active part of the explosive mixture but these drops of fuel, after being broken up and vaporized, would result in richening of the mixture if air for supporting combustion thereof were not supplied. The air which enters through the ball valve and the eyelet 23 and which is directed to break up and vaporize the drops of the heavy ends of the fuel serve also as air for supporting combustion of the heavy ends.

The notches 29 in the seat for the ball 17 are for the purpose of preventing chattering of the ball 17 when engaged with its seat. Chattering occurred when no notches were used and was effectively prevented by the notches 29.

At times when the ball valve is closed, small quantities of air entering through the notches 29 and the eyelet 23 produce on a smaller scale the vaporizing and mixing action previously described.

In the event that the total range of movement of the throttle control rod 11b is greater than the movement of the sleeve valve operating rod 30 required to completely open the sleeve valves, the spring 33 on the sleeve valve operating rod 30 will be compressed when the throttle is opened wide so as to absorb the excess movement of the throttle control rod.

While my vaporizer has been shown in the drawing as applied to an induction system employing a down-draft carburetor, it is obvious that my vaporizer is equally applicable to induction systems employing up-draft carburetors and other types of carburetors. It is also obvious that my vaporizer may be incorporated in a carburetor structure or in an intake manifold structure as well as in a separate unit to be interposed between the carburetor and the manifold as shown, the only limitation being that the chamber of the vaporizer must be connected in the induction system at a point between the throttle valve and the intake valves of the engine.

It is apparent that I have invented a novel, simple, and effective fuel vaporizer which is capable of vaporizing drops of fuel present in the mixture delivered by the carburetor of an internal combustion engine and mixing air therewith, and wherein automatic means is incorporated to prevent operation during idling and rapid acceleration conditions, to permit operation during relatively steady load and speed conditions, and to regulate the extent of its action in accordance with the degree to which the throttle is opened.

It will, of course, be understood that various changes may be made in the form, details, proportions and arrangement of the parts, without departing from the scope of my invention, which, generally stated, consists in a device capable of carrying out the objects above set forth and in the novel parts and combinations of parts disclosed and defined in the appended claims.

What is claimed is:—

1. In combination with the carburetor, intake manifold, throttle valve and throttle valve operating mechanism of an internal combustion engine, a liquid fuel vaporizer including structure providing a chamber located between and opening at its respective ends into said throttle valve and said manifold so that a mixture of oil vapor and air will flow from said carburetor through said throttle valve and then to said manifold through said chamber, a tubular member traversing said chamber, said tubular member having apertures therein, valve means for closing said apertures, actuating connections between said valve means and said throttle valve operating mechanism arranged to operate said valve means to open said apertures coincidentally with opening of said throttle valve, one end of said tubular member being open, and a second valve means in said open end adapted to be sucked open by vacuum in said chamber.

2. In combination with the carburetor, intake manifold, throttle valve and throttle valve operating mechanism of an internal combustion engine, a liquid fuel vaporizer including structure providing a chamber located between said throttle valve and said intake manifold so arranged that explosive mixture will pass from said carburetor through said chamber into said manifold, a sleeve extending transversely through said chamber, said sleeve having apertures respectively located in the upper and lower portions thereof so that a portion of said flow of explosive mixture will pass through the interior of said sleeve, means for substantially closing one end of said sleeve and the other end being provided with a restricted air admitting port adapted to project a jet of air into the interior of said sleeve in an axial direction with respect thereto, whereby explosive mixture flowing through the interior of said sleeve will be traversed and impinged upon by said jet of air.

3. In combination with the carburetor, intake manifold, throttle valve and throttle valve operating mechanism of an internal combustion engine, a liquid fuel vaporizer including structure providing a chamber located between said throttle valve and said intake manifold so arranged that explosive mixture will pass from said carburetor through said chamber into said manifold, a sleeve extending transversely through said chamber, one end of said sleeve being substantially closed and the other end having a portion of slightly reduced internal diameter to produce an inwardly facing annular shoulder forming a valve seat, a ball disposed within the medial portion of said sleeve to engage said seat and resilient means for urging said ball toward said seat, said sleeve being provided with apertures, one of which is located only a slight distance inwardly of said seat to provide for passage of air entering between said ball and said seat into said chamber and second one of which is located further inwardly to provide communication between said chamber and the inner side of said ball whereby said ball will be sucked away from said seat when the vacuum in said chamber is sufficient to overcome said resilient means.

4. The structure defined in claim 3 and means restraining said ball against movement away from said seat beyond a position between said first and second mentioned apertures.

5. The structure defined in claim 3 and said valve seat having a notched portion to provide a passageway of limited capacity when said ball is engaged with said seat.

6. The structure defined in claim 3 and the portion of said sleeve in which the first of said apertures is located being in the side of said sleeve toward said throttle valve whereby admitted air entering said chamber through said aperture will be directed toward said throttle valve.

7. In combination with the carburetor, intake manifold, throttle valve and throttle operating mechanism of an internal combustion engine, a liquid fuel vaporizer including structure providing a chamber located between said throttle valve and said intake manifold so that a mixture of oil vapor and air will pass from said carburetor through said throttle valve and then through said chamber to said intake manifold, and a pair of concentric sleeves extending transversely through said chamber, the inner one of said sleeves being substantially closed at both ends, one of said sleeves being revoluble with respect to the other, each of said sleeves being provided with a series of apertures on the side thereof facing toward said carburetor and a second series of apertures at substantially the opposite side thereof, the apertures of the respective sleeves registering when said revoluble sleeve is in one position relative to the other sleeve whereby a portion of said mixture will pass into the interior of the inner one of said sleeves through said first mentioned series of apertures and will exit through said second mentioned series, the apertures of the respective sleeves not registering when said revoluble sleeve is in another position and partially registering when said revoluble sleeve is in intermediate positions, and said inner sleeve having a passage thereinto for admitting air to the interior of said inner sleeve to break up and mix with the mixture passing through the interior of said inner sleeve.

ISAAC W. WEPPLO.